(12) United States Patent
Isomursu et al.

(10) Patent No.: US 8,718,547 B2
(45) Date of Patent: May 6, 2014

(54) VIRTUAL MACHINE READABLE COMMUNICATION TAG

(75) Inventors: Pekka Isomursu, Oulu (FI); Minna Isomursu, Oulu (FI)

(73) Assignee: Nokia Corporation, Espoo (FI)

( * ) Notice: Subject to any disclaimer, the term of this patent is extended or adjusted under 35 U.S.C. 154(b) by 182 days.

(21) Appl. No.: 13/124,640

(22) PCT Filed: Oct. 15, 2008

(86) PCT No.: PCT/IB2008/002736
§ 371 (c)(1),
(2), (4) Date: Apr. 15, 2011

(87) PCT Pub. No.: WO2010/043918
PCT Pub. Date: Apr. 22, 2010

(65) Prior Publication Data
US 2011/0263204 A1    Oct. 27, 2011

(51) Int. Cl.
*H04B 5/00* (2006.01)

(52) U.S. Cl.
USPC ....................................... 455/41.1; 455/412.1

(58) Field of Classification Search
CPC .... H04B 5/0025; H04B 5/005; H04B 5/0056; H04B 5/0062; H04B 5/0068; H04M 15/00; H04W 4/24; H04W 4/26; H04W 21/431; G06F 21/34; G06F 21/35; G06F 21/36; G06F 21/51; G04Q 30/06
USPC ........... 455/412.1, 41.1, 41.2, 41.3; 340/10.1, 340/10.2, 10.4, 572.1
See application file for complete search history.

(56) References Cited

U.S. PATENT DOCUMENTS

| | | | |
|---|---|---|---|
| 7,570,164 B2 * | 8/2009 | Chakraborty et al. | 340/572.1 |
| 2004/0087273 A1 * | 5/2004 | Perttila et al. | 455/41.2 |
| 2007/0082613 A1 * | 4/2007 | Cox | 455/41.2 |

* cited by examiner

*Primary Examiner* — Ping Hsieh
(74) *Attorney, Agent, or Firm* — Locke Lord LLP

(57) ABSTRACT

A system for imitating the functionality of a machine readable tag using a virtual tag. In at least one embodiment, a WCD (100) may communicate with a machine readable tag (120) and copy the data structure and contents of the machine readable (120) onto the WCD (100). The WCD may create a virtual tag using downloaded information and associate the virtual tag with an image corresponding to the virtual tag. The virtual tag may then be used to imitate the interaction logic between the machine readable tag (120) and the WCD (100).

20 Claims, 6 Drawing Sheets

VIRTUAL MACHINE READABLE COMMUNICATION TAG

RELATED APPLICATION

This application was originally filed as PCT Application No. PCT/IB2008/002736 filed Oct. 15, 2008.

BACKGROUND

1. Field of Invention

Various embodiments of the present invention relate generally to near field communication, and more specifically, to interaction with a machine readable communication tag.

2. Background

While wireless communication devices (WCDs) were perhaps viewed by many as a luxury when first introduced into the marketplace, they are today viewed by our society as very important, useful, and convenient tools. A large segment of society now carries their wireless communication devices with them wherever they go. These devices include, for example, mobile telephones. Personal Digital Assistants (PDAs), laptop/notebook computers, and the like. The popularity of these devices and the ability to communicate wirelessly has spawned a multitude of new wireless systems, devices, protocols, etc. Consumer demand for advanced wireless functions and capabilities has also fueled a wide range of technological advances in the utility and capabilities of wireless devices. Wireless communication devices not only allow voice communication, but also facilitate messaging, multimedia communications, e-mail, Internet browsing, and access to a wide range of wireless applications and services.

More recently, manufacturers have begun to incorporate various devices for providing enhanced functionality in a WCD (e.g., hardware components and software for performing close-proximity wireless information exchanges). Sensors and/or scanners may be used to read visual or electronic information into a device. A transaction may involve a user holding their WCD in proximity to a target, sweeping the device over a tag or document, etc. Machine-readable technologies such as radio frequency identification (RFID), Infrared (IR) communication, optical character recognition (OCR) and various other types of visual, electronic and magnetic scanning are used to quickly input desired information into the WCD without the need for manual entry by a user.

SUMMARY

Various embodiments of the present invention may include at least a method, apparatus, system and computer program for imitating the functionality of a machine readable tag using a virtual tag. In at least one embodiment, a WCD may communicate with a machine readable tag and copy the data structure and contents of the machine readable tag onto the WCD. The WCD may create a virtual tag using the downloaded information and associate the virtual tag with an image corresponding to the virtual tag. The virtual tag may then be used to imitate the interaction logic between the machine readable tag and the WCD. Furthermore, the image associated with the virtual tag may be downloaded directly from the tag or may be obtained from a link downloaded from the tag.

In at least one exemplary embodiment a dedicated application may be initiated on the WCD to read, create, and manage virtual tags.

DESCRIPTION OF DRAWINGS

The disclosure will be further understood from the following description of various exemplary embodiments, taken in conjunction with appended drawings, in which.

DESCRIPTION OF EXEMPLARY EMBODIMENTS

While a multitude of exemplary embodiments have been described below, various changes can be made therein without departing from the spirit and scope of the invention, as described in the appended claims.

The use of machine readable tag-enabled services is currently limited to places where the tags are available. While for some services it may be required to be in a specific location, for many services it is not always necessary to be in a specific location to be able to utilize the machine readable tag-enabled service.

Currently, no effective solution exists that provides services available from a physical machine readable tag from other locations without the presence of the physical machine readable tag. At least some of the embodiments described hereinafter seek to remedy the above need.

I. Wireless Communication Over Different Communication Networks.

Figure 1:
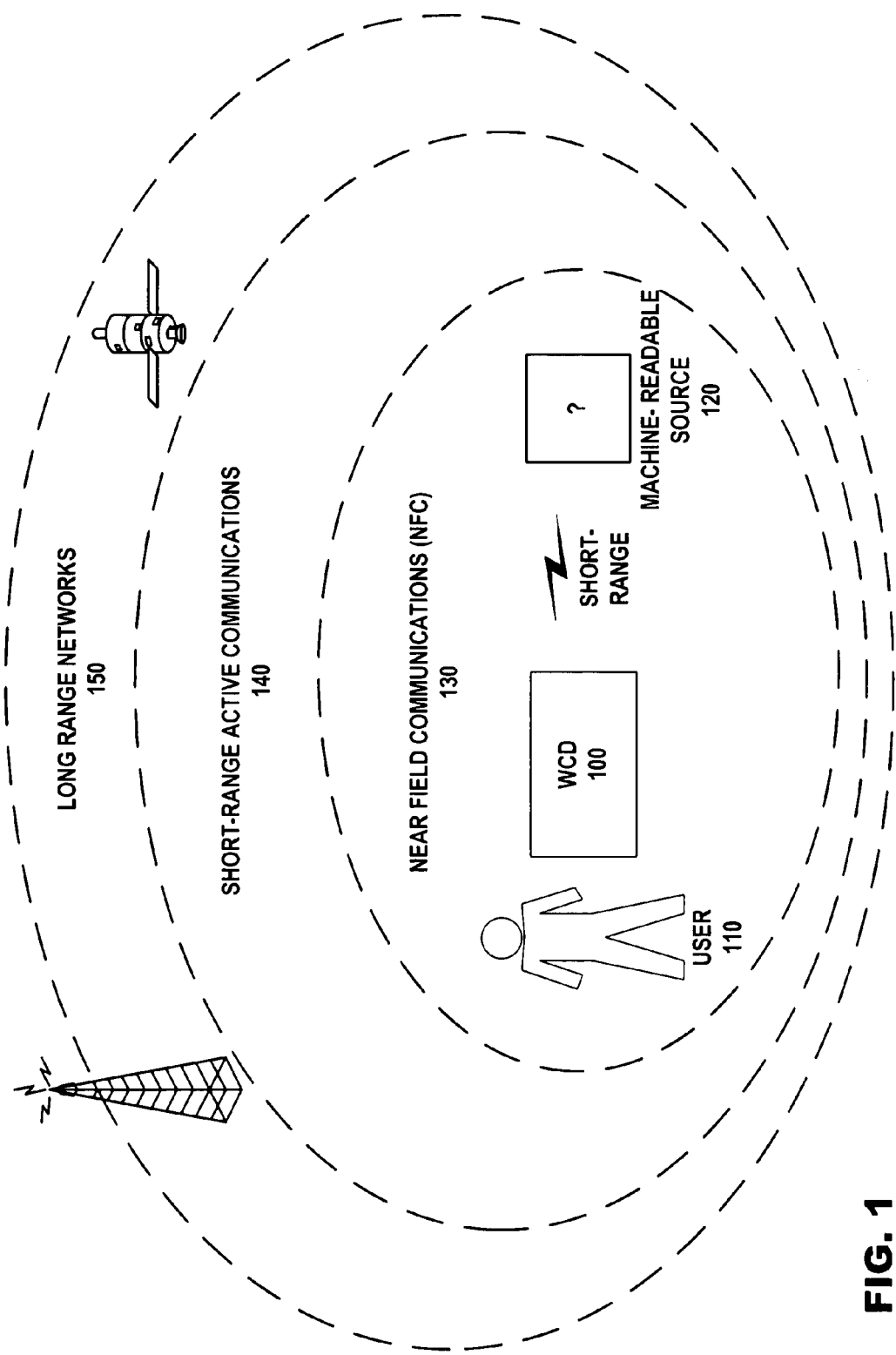
FIG. 1 discloses an exemplary short-range to long-range wireless communication scenario in accordance with at least one embodiment of the present invention.

A WCD may both transmit and receive information over a wide array of wireless communication networks, each with different speed, range, quality (error correction), security (encoding), etc. characteristics. These characteristics will dictate the amount of information that may be transferred to a receiving device, and the duration of the information transfer. FIG. 1 includes a diagram of an exemplary WCD and how it may interact with various types of wireless networks in accordance with at least one embodiment of the present invention.

In the example pictured in FIG. 1, user 110 possesses an exemplary WCD 100. This device 100 may be, for example, a cellular phone, a mobile communication device, a PDA (Personal Digital Assistant), an audio/video player, a digital camera/camcorder, a positioning device like a GPS device (Global Positioning System), a mobile radio/TV device a wirelessly enabled palmtop or laptop computer, etc., or any combination of the aforementioned. Various types of communication may be supported by WCD 100, including the depicted example classifications of Near Field Communications (NFC) 130, short-range active communications 140 and long-range networks 150. Near Field Communications (NFC) 130 may include various transponder-type interactions with machine readable sources 120 wherein normally only the scanning device requires its own power source. Machine readable sources 120 include, for example, RFID tags, barcodes, optical character recognition, etc. WCD 100 may scan source 120 via short-range communication. A transponder in source 120 may use the energy and/or clock signal contained within the scanning signal, as in the case of RFID communication, to respond with data stored in the transponder. These types of technologies usually have an effective transmission range of a few inches to a few feet, and may be able to deliver stored data in amounts from 96 bits to over a megabit or 125 Kbytes relatively quickly. These characteristics make these technologies well suited for identification purposes, such as to receive and/or transmit information or data such as, product information, personal profiles, images, restaurant coupons, location directions, a key code for an automatic door lock, an account number for a credit or debit transaction, pass codes, passwords, etc.

The transmission range between two devices may be extended if both devices are capable of performing powered communications. For example, short-range active communications 140 may include devices wherein the sending and receiving devices are both active. An exemplary situation would include user 110 coming within effective transmission range of a Bluetooth™, Wireless Local Area Network (WLAN), Ultra Wide Band (UWB), Wireless Universal Serial Bus (WUSB), Infrared Data Association (IrDA), Wibree™, etc. access point. In the case of Bluetooth™, a network may automatically be established to transmit information to WCD 100 possessed by user 110. This data may include information of an informative, educational or entertaining nature. The amount of information to be conveyed is unlimited, except that it may be transferred in the time when user 110 is within effective transmission range of the access point. Due to the higher complexity of these networks, additional time is also required to establish the initial connection to WCD 100, which may be increased if many devices queued for service in the area proximate to the access point. The effective transmission range of these networks depends on the technology, and may be from 32 ft. to over 300 ft. with additional power boosting.

Long-range networks 150 may be used to provide virtually uninterrupted communication coverage to WCD 100. Land-based radio stations or satellites may be utilized to relay various communication transactions worldwide.

II. Wireless Communication Device

As previously described, exemplary embodiments may be implemented using a variety of wireless communication equipment. For example, in the case of a cellular telephone or other handheld wireless device, the integrated data handling capabilities play an important role in facilitating transactions between the transmitting and receiving devices.

Figure 2:
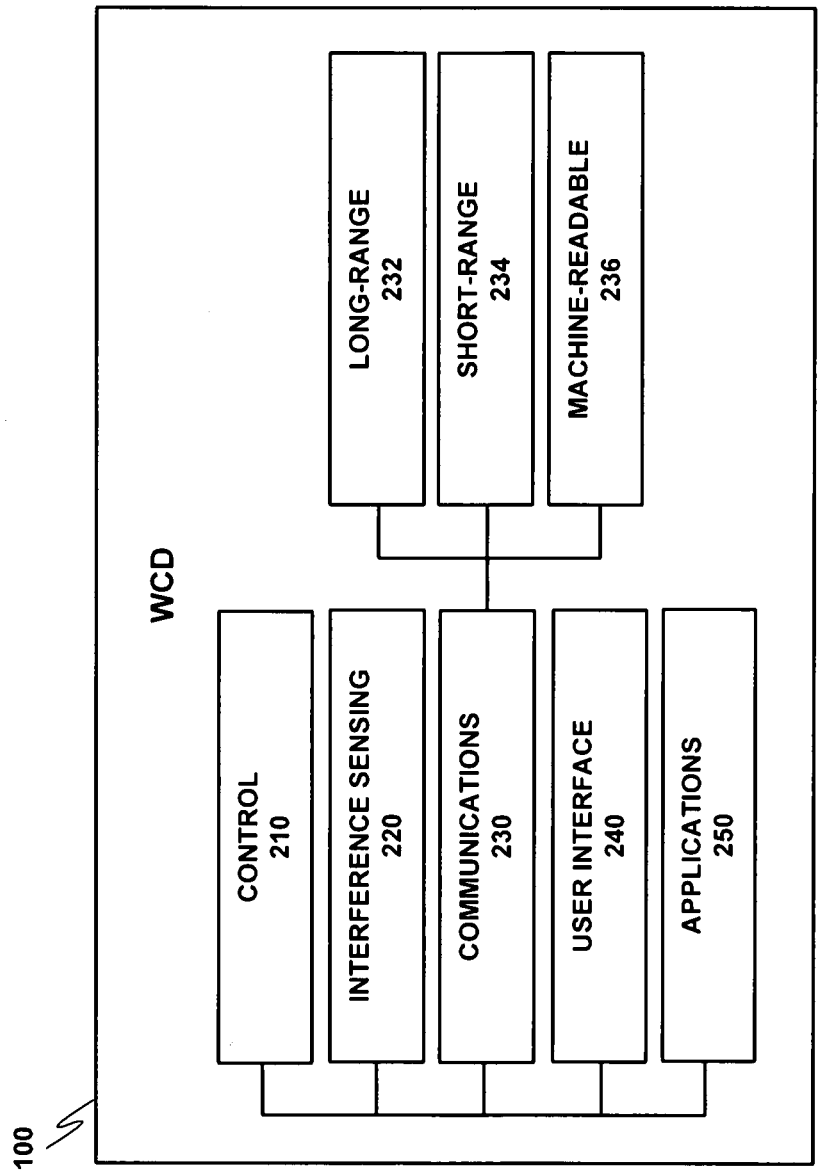
FIG. 2 discloses a modular description of an exemplary wireless communication device usable with at least one embodiment of the present invention.

FIG. 2 discloses an exemplary modular layout for a wireless communication device usable with at least one embodiment of the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs and in response may issue control commands to the other modules in WCD 100.

Communications module 230 may incorporate the communications aspects of WCD 100. As shown in FIG. 2, communications module 230 may include, for example, wireless long-range communications module 232, wireless short-range communications module 234 and wireless machine-readable communications module 236. Communications module 230 utilizes at least these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 may include visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 may incorporate all other hardware and/or software applications on WCD 100. These applications may include sensors, interfaces, utilities, interpreters, data applications, productivity applications, entertainment applications, etc., and may be invoked by control module 210 to read information provided by the various modules and in turn supply information to requesting modules in WCD 100.

Figure 3:
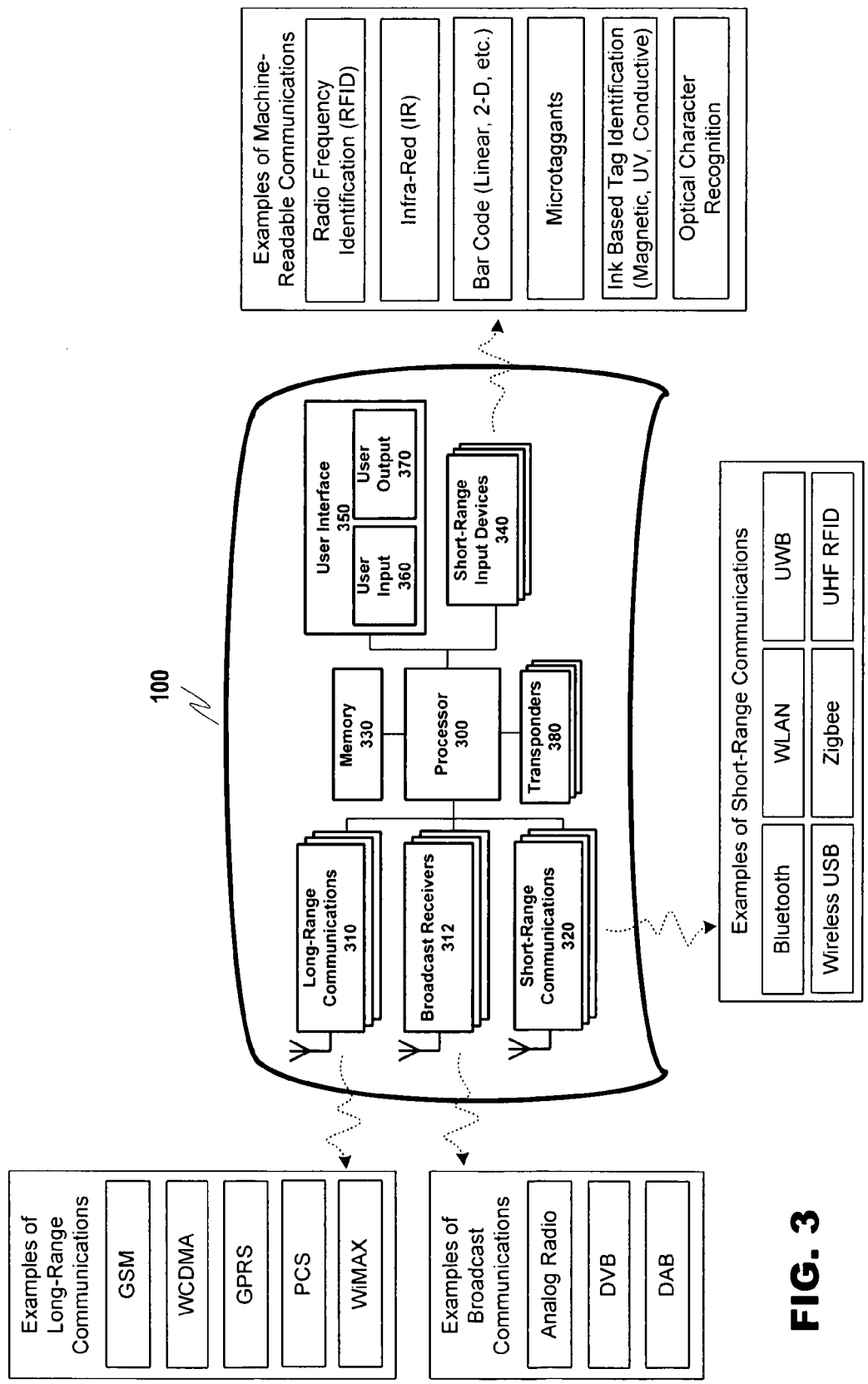
FIG. 3 discloses a structural description of the exemplary wireless communication device previously described in FIG. 2 in accordance with at least one embodiment of the present invention.

FIG. 3 discloses an exemplary structural layout of WCD 100 according to at least one embodiment of the present invention that may be used to implement the functionality of the modular system previously described in FIG. 2. Processor 300 controls overall device operation. As shown in FIG. 3, processor 300 is coupled to at least communications sections 310, 320 and 340 having one or more transceivers. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

Memory 330 may also encompass different forms of removable media that may be accessed by resources within WCD 100. A device such as WCD 100 may be configured to accept different forms of removable media, such as flash memory, CD-ROM, DVD-ROM, etc. Once coupled to, or inserted within, WCD 100, processor 300 may trigger a read/write device to access this removable media in order to load program information and/or other forms of data into memory integrated within WCD 100.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1 G to 3 G. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages. Further, the wireless media specifically-identified above are presented only for the sake of explanation in the disclosure. The present invention is not limited to the aforementioned types of wireless communication media, and may be applicable to any wireless or wired communication medium.

As a subset of long-range communications 310, or alternatively operating as an independent module separately connected to processor 300, broadcast receivers 312 allows WCD 100 to receive transmission messages via mediums such as Analog Radio, Digital Video Broadcast for Handheld Devices (DVB-H), Digital Audio Broadcasting (DAB), etc. These transmissions may be encoded so that only certain designated receiving devices may access the transmission content, and may contain text, audio or video information. In at least one example, WCD 100 may receive these transmissions and use information contained within the transmission signal to determine if the device is permitted to view the received content. As in the case of long-range communications 310, broadcast receivers 312 may be comprised of one or more radio modems utilized to receive a variety of broadcast information.

Short-range communications 320 is responsible for functions involving the exchange of information across short-range wireless networks. As described above and depicted in FIG. 3, examples of such short-range communications 320 are not limited to Bluetooth™, WLAN, UWB, Zigbee, UHF RFID, and Wireless USB connections. Accordingly, short-range communications 320 performs functions related to the establishment of short-range connections, as well as processing related to the transmission and reception of information via such connections.

Short-range input device 340, also depicted in FIG. 3, may provide functionality related to the short-range scanning of machine-readable data (e.g., for NFC). For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (e.g., including processes related to the interpretation of Universal Product Code labels, also known as "UPC" labels), and optical character recognition devices for reading magnetic, UV, conductive or other types of coded data that may be provided in a tag using suitable ink. In order for the short-range input device 340 to scan the aforementioned types of machine-readable data, the input device may include a multitude of optical detectors, magnetic detectors, CCDs or other sensors (not shown) known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This may be a passive device that may be programmed by processor 300 with information to be delivered in response to a scan from an outside source. For example, an RFID scanner mounted in an entryway may continuously emit radio frequency waves. When a person with a device containing transponder 380 walks through the door, the transponder is energized and may respond with information identifying the device, the person, etc. Alternatively, a scanner may be mounted in the WCD so that it can read information from other transponders in the vicinity.

It is important to note that the scope of the functionality of an exemplary mobile device utilized in accordance with at least one embodiment of the present invention need not have all of, or could indeed add additional features to, the previously discussed components and interfaces. The mobile device previously described above is but one example of a usable device.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces. Alternatively, any and/or all of the individual components may be replaced by an integrated circuit in the form of a programmable logic device, gate array, ASIC, multi-chip, module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Protocol (WAP), Hypertext Markup Language (HTML) variants like Compact HTML (CHTML), etc.

Figure 4:
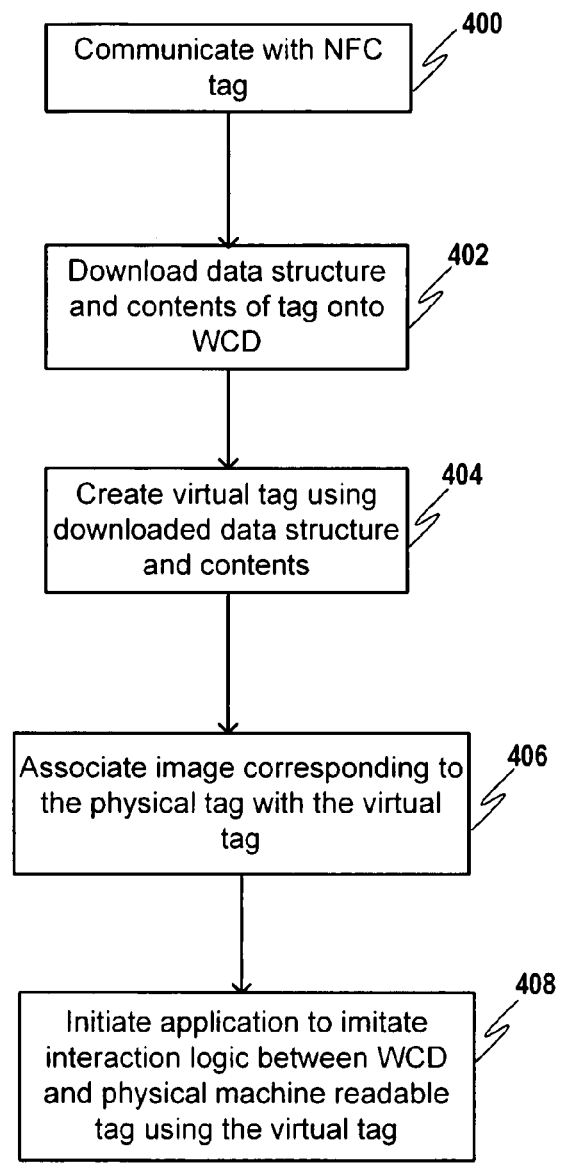
FIG. 4 discloses a flowchart for an exemplary process of duplicating functionality of a machine readable tag using a virtual tag in accordance with at least one embodiment of the present invention.

FIG. 4 discloses a flowchart for an exemplary process of duplicating functionality of a machine readable tag using a virtual tag in accordance with at least one embodiment of the invention. WCD 100 may be utilized to interrogate a machine-readable tag and establish communication with the tag (step 400). The machine readable tag may be, for example, a passive or active NFC/RFID tag. The machine readable tag may then allow WCD 100 to download the data structure of the tag and the contents stored on the tag onto the WCD 100 (step 402). The downloaded data structure and contents may be stored in memory 330 of WCD 100 or alternatively or in addition, may be stored on an external storage device such as a flash card or a write-enabled machine readable tag. The downloaded content may also include an image associated with the tag. Alternatively, the downloaded content may include a link where the image may be downloaded and stored on WCD 100. WCD 100 may then create a virtual tag using the downloaded data structure and contents (step 404). In other words, WCD 100 may create a virtual duplicate of the read machine readable tag using the downloaded data structure and contents. In step 406, the virtual tag may be associated with the downloaded image to assist a user in identifying the functionality associated with the virtual tag. In step 408, an application may be initiated to use or imitate, using the virtual tag, interaction logic between WCD 100 and the physical machine readable tag. In accordance with an exemplary embodiment, WCD 100 interacts with the virtual tag as if it was interacting with the physical tag. Furthermore, WCD 100 may include a dedicated application for creating, reading and/or managing virtual tags.

To illustrate by way of example, a user may scan a machine readable tag at a bus stop using his WCD to determine the bus schedule. However, the user is required to be at the bus stop to be able to scan the machine readable tag and determine the bus schedule. In accordance with an exemplary embodiment, a user may scan the machine readable tag and store the contents of the read tag on the WCD. The stored contents of the read tag may then be used to create a duplicate or virtual tag. Additionally, an image corresponding to the physical tag may also be associated with the virtual tag to assist the user in identifying the functionality associated with the virtual tag. For example, an image of a bus may be associated with the virtual tag to assist the user in determining that the tag is for obtaining bus schedules. The user may initiate an application to read the virtual tag and browse the contents of the virtual tag and imitate the functionality between the physical tag and WCD using the virtual tag. The user may obtain real time bus schedules associated with the physical tag located at the bus stop using the virtual tag without being physically proximate to the physical machine readable tag at the bus stop. To further illustrate, a user who uses several bus stops (e.g., makes connections to several different bus routes) may check using the previously created virtual tag whether the next connecting bus is on time before arriving at that bus stop by connecting to a server to which the physical tag holds a link by simply selecting the virtual tag via the WCD's graphical user interface.

In accordance with an exemplary embodiment, a dedicated application on WCD 100 may be utilized to read, create and manage virtual tags. The application may include options to for example, show on a map the location of a physical tag corresponding to the virtual tag. The application may also allow copying of the virtual tag onto a write-enabled physical tag. Additionally, the user may take a picture of the physical tag location and an option may show the picture of the physical tag location when browsing through the virtual tags (e.g., associate the picture of the location of the physical tag with the virtual tag).

Figure 5:
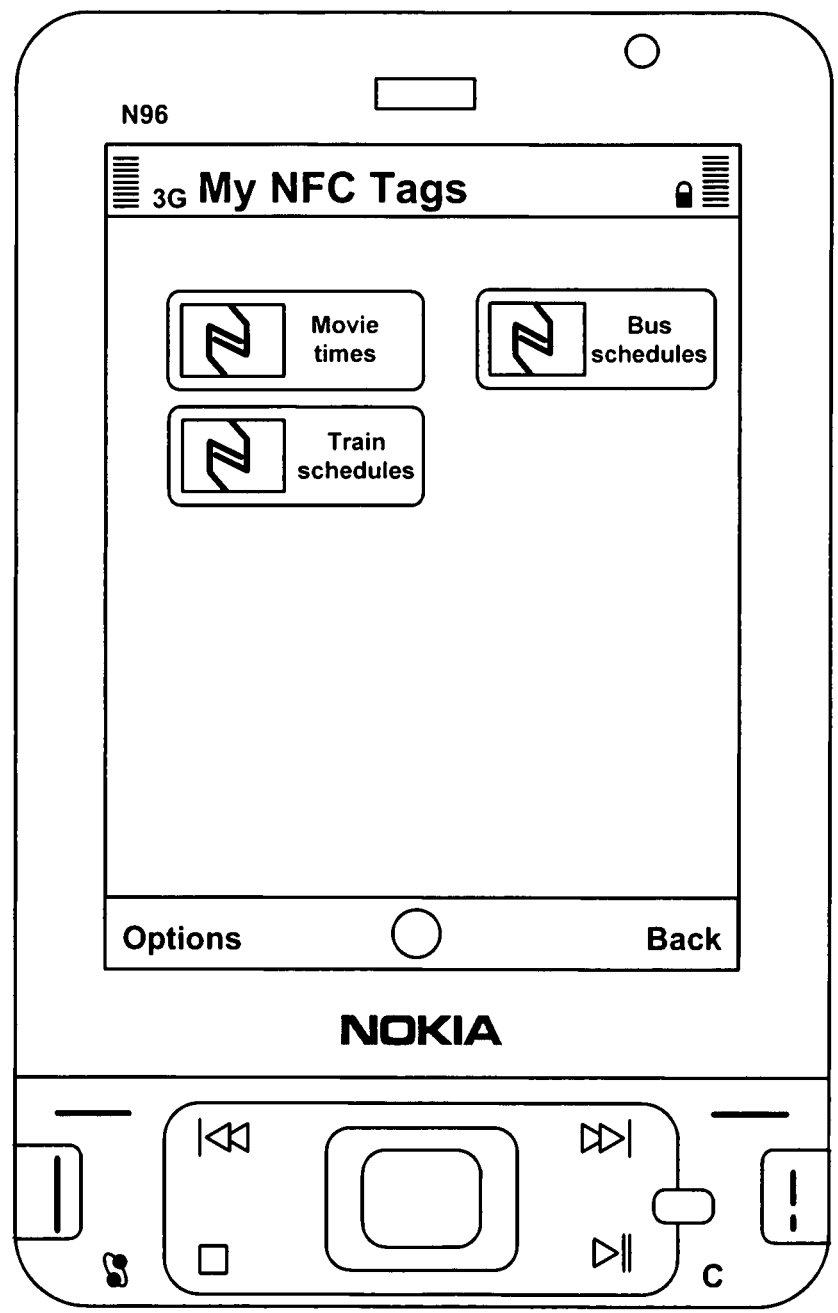
FIG. 5 discloses an exemplary graphical user interface (GUI), in accordance with at least one embodiment of the present invention, of a dedicated application for creating, reading and/or managing virtual tags.

FIG. 5 discloses, in accordance with an exemplary embodiment, an exemplary graphical user interface (GUI) of a dedicated application for creating, reading and/or managing virtual tags. The GUI may display visual representations of the virtual tags as images associated with the virtual tags or as icons. In accordance with an exemplary embodiment, selecting a virtual tag through the GUI may enable options such as, for example, "Show on map", which may show the geographic location of a corresponding physical tag, i.e. the physical location where the virtual tag was created that may be useful information to a user, "Create physical copy", which may enable copying of the virtual tag into a write enabled physical tag, and "Use virtual tag", which may launch the tag functionality (e.g., imitate the interaction logic between the WCD and the physical tag).

Figure 6:
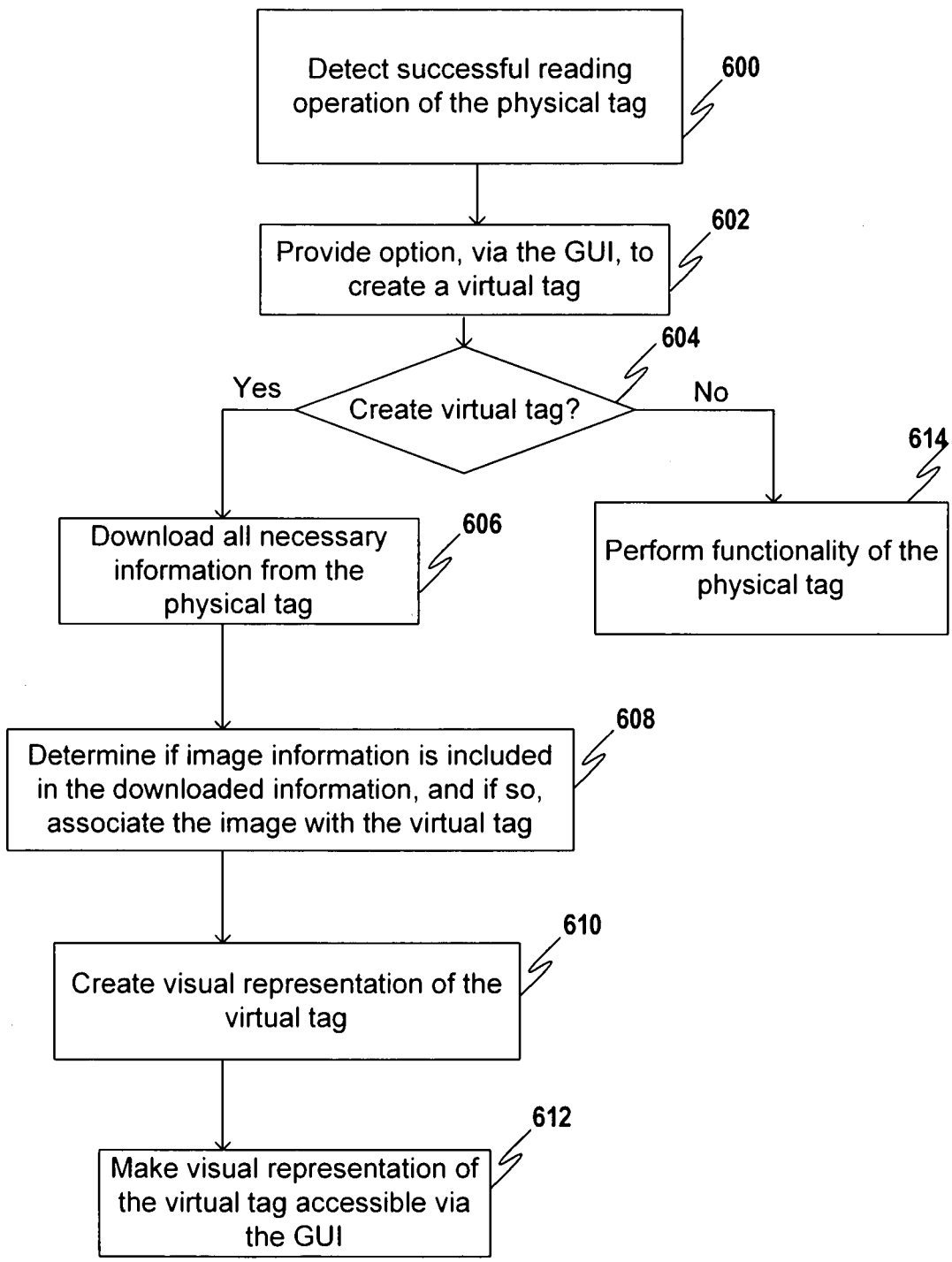
FIG. 6 discloses a flowchart for an exemplary process of creating a virtual tag in accordance with at least one embodiment of the present invention.

FIG. 6 discloses a flowchart for an exemplary process of creating a virtual tag in accordance with at least one embodiment of the present invention. When the WCD is utilized to interrogate a physical machine readable tag, the dedicated application may detect a successful reading operation of the tag (step 600). The dedicated application may then provide an option via the GUI for a user to create a virtual tag (step 602). If the user selects "no" to query 604, the application may launch the functionality of the physical tag (step 614).

In accordance with an exemplary embodiment, if the user selects "yes" to query 604, the application may, in step 606, download all necessary information (e.g., data structure, contents, etc.) from the physical tag to a specific memory location (e.g., memory reserved for tag related and context/location related information for virtual tag handling and management). Furthermore, the application may determine if image information (e.g., an image to be associated with the virtual tag or a link where the image may be downloaded) is included in the downloaded information, and if so, the application may associate the image (downloaded from the tag or downloaded from the provided link) with the virtual tag (step 608). Alternatively, or in addition, the application may provide the user with an option to associate an image of the user's choosing with the virtual tag. The application may now create a visual representation of the virtual tag (e.g., with the downloaded image or with an image of the user's choosing) (step 610) and make the visual representation of the virtual tag accessible to the user via the GUI (step 612).

Accordingly, it will be apparent to persons skilled in the relevant art that various changes in form and detail can be made therein without departing from the spirit and scope of the invention. The breadth and scope of the present invention should not be limited by any of the above-described exemplary embodiments, but should be defined only in accordance with the following claims and their equivalents.

What is claimed:
1. A method, comprising:
 interacting, by a reader device, with a machine readable tag via short range communication;
 creating a virtual tag by reading and storing at least a data structure and associated content of the machine readable tag to a memory of the reader device; and
 initiating an application at the reader device to perform an operation imitating one or more actions that takes place when reading the machine readable tag, using the stored data structure and associated content, upon detecting selection of the virtual tag via a user interface of the reader device.

2. The method according to claim 1, wherein creating a virtual tag includes associating information downloaded from the machine readable tag with a visual indication corresponding to the machine readable tag.

3. The method according to claim 2, further comprising:
downloading the visual indication corresponding to the machine readable tag from the machine readable tag.

4. The method according to claim 2, further comprising:
downloading the visual indication corresponding to the machine readable tag from a link obtained from the machine readable tag.

5. The method according to claim 1, wherein the application creates a visual representation of the virtual tag and makes the virtual tag accessible via a graphical user interface.

6. The method according to claim 1, wherein the application uploads a physical copy of the virtual tag to a write-enabled machine readable tag upon detecting selection of such action associated with the virtual tag.

7. An apparatus, comprising:
a wireless short range communication module;
a processor coupled to the wireless communication module;
a memory including computer program code;
the memory and the computer program code configured to, with the processor, cause the apparatus at least to:
interact with a machine readable tag via short range communication;
create a virtual tag by reading and storing at least a data structure and associated content of the machine readable tag to a memory of the apparatus; and
initiate an application at the apparatus to perform an operation imitating one or more actions that takes place when reading the machine readable tag, using the stored data structure and associated content, upon detecting selection of the virtual tag via a user interface of the apparatus.

8. The apparatus according to claim 7, further comprising:
the memory and the computer program code configured to, with the processor, cause the apparatus at least to:
associate information downloaded from the machine readable tag with a visual indication corresponding to the machine readable tag.

9. The apparatus according to claim 8, further comprising:
the memory and the computer program code configured to, with the processor, cause the apparatus at least to:
download the visual indication corresponding to the machine readable tag from the machine readable tag.

10. The apparatus according to claim 8, further comprising:
the memory and the computer program code configured to, with the processor, cause the apparatus at least to:
download the visual indication corresponding to the machine readable tag from a link obtained from the machine readable tag.

11. The apparatus according to claim 10, further comprising a long range communications module configured to provide a wireless connection to a destination provided by the link obtained from the machine readable tag.

12. The apparatus according to claim 7, further comprising:
the memory and the computer program code configured to, with the processor, cause the apparatus at least to:
create a visual representation of the virtual tag and make the virtual tag accessible via a graphical user interface.

13. The apparatus according to claim 7, further comprising:
the memory and the computer program code configured to, with the processor, cause the apparatus at least to:
upload a physical copy of the virtual tag to a write-enabled machine readable tag upon detecting selection of such action associated with the virtual tag.

14. A computer program product comprising a computer usable non-transitory medium having computer readable program code embodied in said medium, comprising:
a computer readable program code configured to cause an apparatus to interact with a machine readable tag via short range communication;
the computer readable program code configured to create a virtual tag by reading and storing at least a data structure and associated content of the machine readable tag to a memory of the apparatus; and
the computer readable program code configured to initiate an application at the apparatus to perform an operation imitating one or more actions that takes place when reading the machine readable tag, using the stored data structure and associated content, upon detecting selection of the virtual tag via a user interface of the apparatus.

15. The computer program product according to claim 14, further comprising:
the computer readable program code configured to associate information downloaded from the machine readable tag with a visual indication corresponding to the machine readable tag.

16. The computer program product according to claim 15, further comprising:
the computer readable program code configured to cause the apparatus to download the visual indication corresponding to the machine readable tag from the machine readable tag.

17. The computer program product according to claim 15, further comprising:
the computer readable program code configured to download the visual indication corresponding to the machine readable tag from a link obtained from the machine readable tag.

18. The computer program product according to claim 14, wherein the application creates a visual representation of the virtual tag and makes the virtual tag accessible via a graphical user interface.

19. The computer program product according to claim 14, further comprising:
the computer readable program code configured to upload a physical copy of the virtual tag to a write-enabled machine readable tag upon detecting selection of such action associated with the virtual tag.

20. A system, comprising:
a machine readable tag;
a reader device, the reader device configured to:
interact with the machine readable tag via short range communication;
create a virtual tag by reading and storing at least a data structure and associated content of the machine readable tag to a memory of the reader device; and
initiate an application at the reader device to perform an operation imitating one or more actions that takes place when reading the machine readable tag, using the stored data structure and associated content, upon detecting selection of the virtual tag via a user interface of the reader device.

* * * * *